July 21, 1970  J. O. GALLANT ET AL  3,521,340
FLUID BEARING ROLL WITH VIBRATION DAMPING MEANS
Filed April 3, 1968
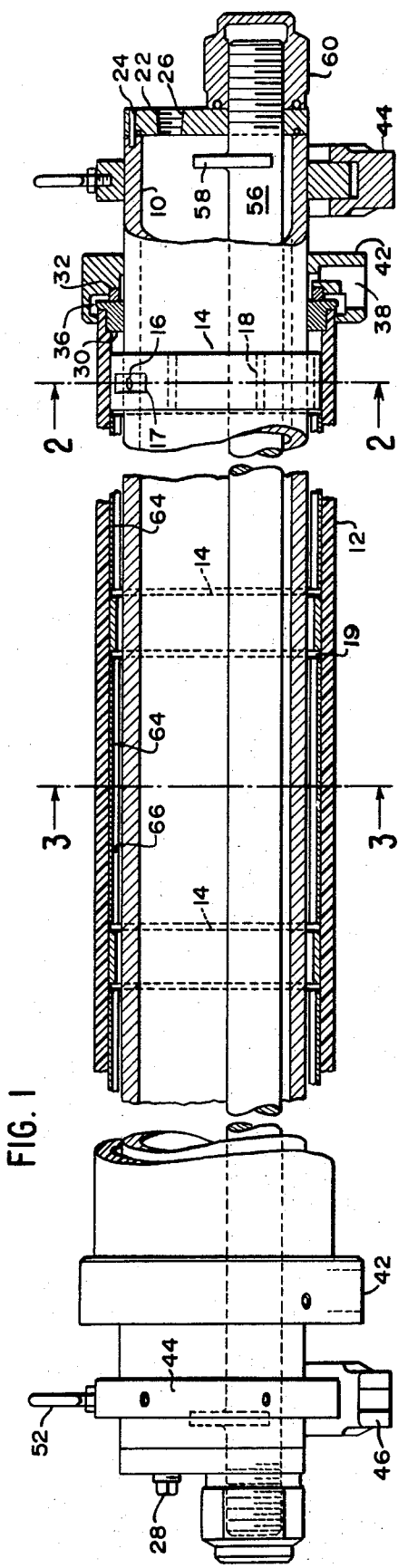
FIG. 1
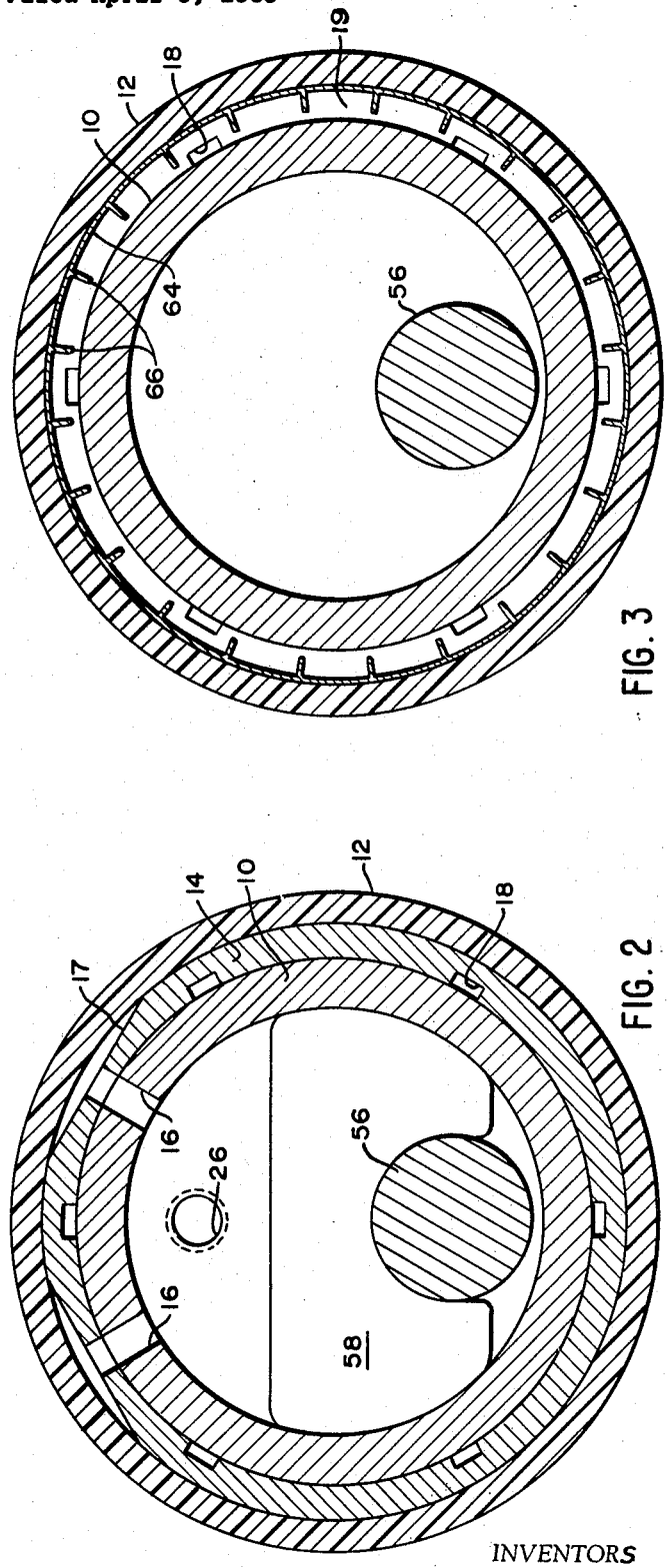
FIG. 3
FIG. 2
INVENTORS
GEORGE P. KNAPP
JAMES O. GALLANT
BY
Kenway, Jenney & Hildreth
ATTORNEYS

United States Patent Office 3,521,340
Patented July 21, 1970

---

3,521,340
FLUID BEARING ROLL WITH VIBRATION DAMPING MEANS
James O. Gallant, Rehoboth, and George P. Knapp, Waban, Mass., assignors to Mount Hope Machine Company, Incorporated, Taunton, Mass., a corporation of Massachusetts
Filed Apr. 3, 1968, Ser. No. 718,393
Int. Cl. B21b 13/02; F16f 15/10
U.S. Cl. 29—116     3 Claims

ABSTRACT OF THE DISCLOSURE

To dampen the vibrations of a roll comprising an annular roller sleeve which is rotatably mounted by means of fluid bearing spaced along an axle, either the axle or the sleeve has a non-circular cross-section to form projections into fluid-filled annular clearance spaces extending around the axle between the fluid bearings. These spaces bleed fluid from the bearings toward the ends of the axle. These projections divide the clearance spaces into small pockets to prevent the wave action which causes vibration. The projections may take the form of fins. Annular dams may also be provided at the ends of the sleeve, in conjunction with the fins or as an alternative measure, to define small passages for the escape of fluid; this keeps the clearance spaces full of fluid and so reduces wave action, a major source of vibration.

BACKGROUND AND BRIEF DESCRIPTION OF THE INVENTION

The present invention is concerned with the problem of vibration in rolls having fluid bearings, and is particularly directed to, although not limited in application to, table rolls used in Fourdrinier machines for the drainage of water from suspensions of paper fibers carried by a travelling screen or wire. The recognition in recent times of the desirability of reducing the diameters of table rolls has aggravated the vibration problem because the rigidity of these rolls is correspondingly lessened. Good workmanship, careful attention to tolerances, and the use of conventional balancing techniques alleviate but do not eliminate harmful vibration.

In table rolls of the kind in which a fluid flow forms a bearing between a rotating roller sleeve and a stationary axle, vibration in the first natural mode of bending has been observed in nearly all cases. The amplitude is often great enough to make the rolls impractical for use in a paper machine. Vibration may occur over a speed range of several hundred feet per minute, beginning at the critical speed of the roll, that is, the speed corresponding to the natural frequency of roll vibration. Small-diameter table rolls are normally operated above this critical speed.

It is generally considered desirable to design a water-lubricated table roll so that the clearance spaces bounded by the axle on the inside, the roller sleeve on the outside, and the fluid bearing rings spaced along the axle, will normally be only partly full of water. The intention is to reduce turbulence and thus decrease the power required to turn the roll. However, a roll so designed is found to be subject to vibration, often of severe amplitude, at a frequency equal to the first natural frequency of the roll vibrating as a beam. This vibration is not caused by unbalance of the roller sleeve, the only rotating part, since the frequency is unrelated to the rotational speed. Further, this vibration occurs primarily in a vertical plane, whereas imbalance causes vibration in all planes passing through the roll axis.

It is thought that this vibration is caused by oppositely moving waves running circumferentially up and down the sides of the roller sleeve and reinforcing themselves as they meet at the top and bottom. Acceleration forces are substantially equal on both sides of the roll, so the circumferentially travelling waves propagate at equal speed. The surging causes vibration and vice versa, so that the process is self-sustaining. The frequency is equal to the natural frequency of the roll, since only at this frequency does a small periodically varying disturbing force produce a substantial amplitude.

It is the general object of this invention to provide means for dampening the vibrations of a roll having fluid bearings. The invention is particularly directed to the problem of dampening vibrations of a high-speed roll of this type, such as a table roll of a Fourdrinier machine. Further objects and advantages will appear as the following description proceeds.

We carry out our invention in conjunction with a roll having a stationary axle, on which an annular roller sleeve is rotatably mounted by means of a series of fluid bearings rings. Annular clearance spaces are defined between the axle and sleeve in areas falling between the bearing rings. These rings are provided with suitable orifices through which a flow of lubricating fluid is directed against the interior of the roller sleeve, thence escaping toward the ends of the sleeve through the annular clearance spaces.

According to one aspect of the invention, we form either the external surface of the axle, or the internal surface of the roller sleeve, with a non-circular cross-section, to afford projections which extend into the annular clearance spaces. These projections divide up the annular clearance spaces into small pockets, to prevent the wave action which is a major cause of vibration. The projections may take the form of a series of fins.

According to another aspect of the invention, annular dams are provided at the ends of the roller sleeve, and these have very small clearances about the axle. In this way, the annular clearance spaces between the axle and sleeve may be kept substantially full of fluid; this tends to reduce the wave action which was previously described as a principal source of vibration.

Projections and dams may be utilized in conjunction for the maximum damping action, or either may be used individually. The projections increase turbulence, which requires some additional power to rotate the roll. On the other hand, the use of dams may necessitate some increase in the rate of flow of lubricating fluid in order to keep the clearance spaces purged of air, which tends to become entrained in the fluid. Dams may also tend to increase the power requirements because of the additional turbulence created by the sleeve rotating around completely filled clearance spaces. The additional expenditure of power will, in many applications of the invention, be considered more than amply repaid by the resulting reduction in roll vibration.

While the specification concludes with claims particularly pointing out the subject matter which we regard as our invention, it is believed that a clearer understanding may be gained from the following description of preferred embodiments thereof, referring to the accompanying drawing, in which:

FIG. 1 is a fragmentary view in side elevation, and partially in section, of a fluid bearing roll embodying the invention;

FIG. 2 is a sectional view taken along line 2—2 in FIG. 1, looking in the direction of the arrows; and FIG. 3 is a sectional view taken along line 3—3 in FIG. 1, looking in the direction of the arrows.

An embodiment of the invention in a table roll for a Fourdrinier machine is illustrated in the drawing. The roll includes a tubular axle or support 10 of circular cylindrical cross-section. The axle is mounted in a horizontal position by means of mounting brackets 44 at either end, each bracket having a base 46, and a lifting ring 52 for convenience in installing the roll.

Extending lengthwise through the axle 10 is a tension rod or bolt 56 having threaded ends on which nuts 60 are received. Stout abutments or end plates 22 are mounted in sealing engagement on the opposite ends of the axle, and have openings through which the bolt 56 passes. These end plates are attached and aligned with the axle by means of screws 24. Threaded ports 26 are provided in either abutment 22 for supplying a flow of fluid to the hollow interior of the axle 10; one of these openings is shown closed by a plug 28. The tension bolt 56 extends parallel to, but is spaced vertically beneath, the major longitudinal axis of the roll, which coincides with its neutral axis of transverse bending. Upon tightening of the nuts 60, the rod 56 is subjected to tension, placing the axle under an eccentric longitudinal compressive force. This force is used to remove longitudinal curvature from the roll when a working load is applied, as is more fully described in U.S. Pat. Nos. 3,099,072 issued Juy 30, 1963 to J. D. Robertson et al., and 3,094,771 issued June 25, 1963 to J. D. Robertson. The nuts 60 are tightened to deflect the axle to an upwardly convex form when the roll is unloaded, so that it will assume an axially straight configuration when the lead is applied. A pair of plates 58 are welded or otherwise attached near the ends of the bolt 56, and have surfaces conforming to the internal walls of the axle 10 to prevent the bolt from rotating when the nuts 60 are tightened. It is to be understood that the tension bolt 56 is not necessary or essential to the practice of the present invention, but it is considered desirable for use with relatively long straight rolls such as the table rolls of a Fourdrinier machine, because this expedient makes it feasible to reduce the roll diameter.

An annular roller sleeve 12, of such material as may be suitable for the particular use of the roll, is received circumferentially about the axle 10 with an annular clearance. This sleeve is rotatable on the axle and serves to support a travelling sheet, web, or band, such, for example, as the wire or screen of a Fourdrinier machine, which would rest on the vertical top of the sleeve. In the construction shown, the sleeve should be substantially rigid against distortion under the applied load, and is supported by fluid bearings like those described and claimed in U.S. patent application Ser. No. 505,101 for a "Fluid Bearing Table Roll," filed by J. D. Robertson on Oct. 15, 1965. Pairs of orifices 16 are formed through the axle 10 and a series of bearing rings 14, which are fixed in axially-spaced relation along the axle. The orifices are arranged in two longitudinal rows, each parallel to the axle of the roll, and these rows define a minor arcuate sector of the axle between them. The load is intended to act vertically in the illustrated case, along a vertical plane passing through the axis of the roll, which plane bisects the arc defined between the rows of orifices 16. These orifices serve to distribute a flow of water or other lubricating fluid, supplied to the hollow interior of the axle 10 through the open one of the ports 26, to clearances defined between the outer circumferences of the rings 14 and the interior surface of the sleeve 12. These clearances are small, and therefore do not appear in the drawing. Distribution of the bearing fluid is improved by forming flats 17 in the surfaces of the bearing rings 14 over the exit ends of the orifices 16. In the axial spaces between the bearing rings 14, enlarged annular clearance spaces 19 are defined between the axle 10 and the sleeve 12. A series of return ports 18 are formed about the inner circumferences of the bearing rings 14 to maintain a high rate of flow through the clearance spaces 19, and thence out through the ends of the sleeve. The entrainment of air in the bearing liquid might otherwise tend to produce pockets of air entrapped in these annular clearances, which would result in additional vibration.

A roll constructed as thus far described is subject to substantial vibration, particularly along vertical axes at the first natural frequency of the roll vibrating as a beam, for reasons previously explained. To dampen this vibration, we form the outer surface of the axle, or the inner surface of the sleeve, with a non-circular or irregular cross-section; in the embodiment shown, this comprises a series of fins 66 projecting radially inwardly from the sleeve into the clearance spaces 19, terminating short of contact with the axle 10. The fins 66 are integrally formed in cylindrical inserts 64 of extruded plastic or other suitable material, received in axially-alternating relation with the bearing rings 14 inside the sleeve 12. The inserts 64 may be secured in place by dimensioning them for a snug fit in the internal surface of the sleeve.

The fins divide the annular space 19 into small pockets preventing the build-up of the waves which cause vibration. The amplitude of roll vibration is thus greatly reduced. The fins might alternatively be mounted on the outer circumference of the axle 10. The surface of the sleeve or of the axle may have any irregular form other than a circular shape with a similar effect.

As an additional or alternative means of dampening vibration, we mount annular dams 30 in either end of the sleeve. These dams form small annular clearances about the axle 10 to increase the depth of fluid in the spaces 19, thereby inhibiting the vibratory wave-making action associated with partially-filled spaces. The flow of bearing fluid travels from the bearings 14 through the spaces 19 toward either end of the sleeve 12, and thence through the dams. Thrust bearings 32 are mounted in collars 42 to locate the dams 30 and sleeve 12 with respect to the axle. The fluid is drained from either end of the sleeve through a passage 38 formed in each collar 42, which also has an arcuate recess 36 for draining any fluid escaping between the elements 30 and 32. The fluid may then be recirculated by a pump to the inlet port 26, or discarded, as desired.

The function of the dams 30 is to insure that the spaces 19 will remain full of fluid, thereby preventing the vibratory wave-making action associated with partially-filled spaces.

The fins 66 or other projections, and the dams 30, may be employed individually or used in combination. The power required to rotate the projections and sleeve is normally obtained from the wire, sheet, web, or other material travelling over the roll; but the roll may be driven directly through belting or gears in a known manner, if the material has insufficient driving force or it is undesirable to subject the particular material to additional tension. The use of the dams may require some increase in the flow rate of the bearing fluid to purge the clearance spaces of air entrained in the fluid, which might otherwise result in a partially full condition and consequent vibration. These requirements are recompensed by the effective reduction of vibration achieved by our improved damping means.

What we claim is:

1. A roll having vibration-damping means, said roll comprising an axle member, means mounting said axle member in a stationary position, an annular roller sleeve member extending circumferentially about said axle member, a series of fluid bearings axially spaced along said axle member and rotatably mounting said sleeve member thereon, said sleeve member, said axle member, and said bearings defining annular clearance spaces therebetween, means for supplying a flow of bearing fluid to said bearings for delivery to the interior of said sleeve member and thence through said clearance spaces toward the ends of said sleeve member, a pair of annular dams received in the ends of said sleeve member and defining, about said axle member, exhaust flow restrictions to maintain said annular clearance spaces substantially fully of fluid, at least one of said members being provided with a plurality of projections protruding therefrom into said annular clearance spaces and terminating short of the other of said members to provide clearance for relative rotation of said members.

2. A roll having vibration-damping means, said roll comprising an axle member, means mounting said axle member in a stationary position, an annular roller sleeve member extending circumferentially about said axle member, a series of fluid bearings axially spaced along said axle member and rotatably mounting said sleeve member thereon, said sleeve member, said axle member, and said bearings defining annular clearance spaces therebetween, means for supplying a flow of bearing fluid to said bearings for delivery to the interior of said sleeve member and thence through said clearance spaces toward the ends of said sleeve member, at least one of said members being provided with a plurality of projections protruding therefrom into said annular clearance spaces and terminating short of the other of said members to provide clearance for relative rotation of said members.

3. A roll as recited in claim 2, said projections comprising fins affixed to cylindrical inserts mounted internally in said sleeve member between said fluid bearings.

References Cited
UNITED STATES PATENTS

| | | |
|---|---|---|
| 3,070,872 | 1/1963 | Ulrichs et al. |
| 3,276,102 | 10/1966 | Justus. |
| 3,362,055 | 1/1968 | Bryce. |

WALTER A. SCHEEL, Primary Examiner

L. G. MACHLIN, Assistant Examiner

U.S. Cl. X.R.

74—574